US010496098B2

United States Patent
Zhu et al.

(10) Patent No.: US 10,496,098 B2
(45) Date of Patent: Dec. 3, 2019

(54) ROAD SEGMENT-BASED ROUTING GUIDANCE SYSTEM FOR AUTONOMOUS DRIVING VEHICLES

(71) Applicant: Baidu USA LLC, Sunnyvale, CA (US)

(72) Inventors: Fan Zhu, Sunnyvale, CA (US); Qi Kong, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 156 days.

(21) Appl. No.: 15/702,683

(22) Filed: Sep. 12, 2017

(65) Prior Publication Data

US 2019/0079524 A1    Mar. 14, 2019

(51) Int. Cl.
  G05D 1/02    (2006.01)
  B62D 15/02   (2006.01)
  G01C 21/34   (2006.01)
  G05D 1/00    (2006.01)

(52) U.S. Cl.
  CPC ....... *G05D 1/0212* (2013.01); *B62D 15/0255* (2013.01); *G01C 21/34* (2013.01); *G05D 1/0088* (2013.01); *G05D 1/0274* (2013.01); *G05D 2201/0212* (2013.01)

(58) Field of Classification Search
  CPC .. G05D 1/0212; G05D 1/0088; G05D 1/0274; G05D 2201/0212
  See application file for complete search history.

(56) References Cited

U.S. PATENT DOCUMENTS

| | | | | |
|---|---|---|---|---|
| 9,645,577 | B1 * | 5/2017 | Frazzoli | G05D 1/0214 |
| 2012/0136509 | A1 * | 5/2012 | Everett | E02F 9/2045 701/2 |
| 2014/0278052 | A1 * | 9/2014 | Slavin | G01C 21/3492 701/400 |
| 2016/0138924 | A1 * | 5/2016 | An | G01C 21/34 701/25 |
| 2016/0358479 | A1 * | 12/2016 | Riedelsheimer | H04L 67/12 |
| 2016/0368505 | A1 * | 12/2016 | Sorstedt | B60W 30/12 |
| 2017/0008521 | A1 * | 1/2017 | Braunstein | G01C 21/32 |
| 2017/0017239 | A1 * | 1/2017 | Kanai | G05D 1/02 |
| 2017/0154225 | A1 * | 6/2017 | Stein | B60W 30/16 |
| 2017/0336788 | A1 * | 11/2017 | Iagnemma | G05D 1/0038 |
| 2017/0336790 | A1 * | 11/2017 | Glebov | G05D 1/0088 |
| 2017/0371336 | A1 * | 12/2017 | Mei | G05D 1/0212 |
| 2017/0371337 | A1 * | 12/2017 | Ramasamy | G05D 1/0088 |
| 2018/0087907 | A1 * | 3/2018 | DeBitetto | G05D 1/0088 |

(Continued)

*Primary Examiner* — Frederick M Brushaber
(74) *Attorney, Agent, or Firm* — Womble Bond Dickinson (US) LLP

(57) ABSTRACT

In one embodiment, a routing request is received for routing an autonomous driving vehicle (ADV) from a source lane to a target lane. One or more road paths are determined from a source road to a target road. The road paths include zero or more intermediate roads in between, where each intermediate road includes one or more intermediate lanes. For each of the road paths, one or more lane paths are determined. Each lane path includes a number of lanes in combination to connect the source lane of the source road to the target lane of the target road via at least one of the intermediate lanes of the intermediate roads. A trajectory is planned from the source plane of the source road to the target lane of the target road using the lane paths to drive the ADV according to the trajectory.

21 Claims, 12 Drawing Sheets

(56) References Cited

U.S. PATENT DOCUMENTS

| | | | |
|---|---|---|---|
| 2018/0107215 A1* | 4/2018 | Djuric | G01C 21/26 |
| 2018/0113460 A1* | 4/2018 | Koda | G05D 1/0088 |
| 2018/0113474 A1* | 4/2018 | Koda | G08G 1/09 |
| 2018/0136651 A1* | 5/2018 | Levinson | G05D 1/0044 |
| 2018/0151066 A1* | 5/2018 | Oba | G08G 1/096725 |
| 2018/0189578 A1* | 7/2018 | Yang | G01C 21/3635 |
| 2018/0224289 A1* | 8/2018 | Pollock | G06F 16/29 |
| 2018/0237018 A1* | 8/2018 | Goto | B60W 30/14 |
| 2018/0237019 A1* | 8/2018 | Goto | B60W 30/14 |
| 2018/0259956 A1* | 9/2018 | Kawamoto | B60W 40/09 |
| 2018/0284774 A1* | 10/2018 | Kawamoto | B60W 50/10 |

\* cited by examiner

Road Connection Table
351

| Start Road | End Road | Start Lane | End Lane |
|---|---|---|---|
| R1 | R2 | A1 | C1 |
| R1 | R2 | A1 | C2 |
| R1 | R2 | A2 | C1 |
| ... | ... | ... | ... |
| R1 | R5 | A1 | C3 |
| R5 | R4 | E | M1 |
| ... | ... | ... | ... |
| R1 | R3 | A1 | D2 |
| ... | ... | ... | ... |

FIG. 5A

Road/Lane Table 352

| Road | Lanes |
|------|-------|
| R1 | A1, A2, A3, B1, B2, B3, C1, C2, C3 |
| R2 | D1, D2 |
| R3 | S1, S2, S3, T1, T2, T3 |
| R4 | M1, M2, N1, N2 |
| R5 | E |
| ... | ... |

Lane Connection Table
353

| Lane In | Lane Out | Type |
|---|---|---|
| C3 | E | Turn right |
| E | M1 | Turn right |
| B3 | C3 | Follow |
| ⋮ | ⋮ | ⋮ |

FIG. 5C

| Lane ID | Length | Width | Location |
|---|---|---|---|
| A1 | ... | ... | ... |
| A2 | ... | ... | ... |
| A3 | ... | ... | ... |
| ... | ... | ... | ... |

Lane Table 354

531 — Lane ID
532 — Length
533 — Width
534 — Location

FIG. 5D

| Lane Region | Lanes |
|---|---|
| Region 1 | A1, B1, C1 |
| Region 2 | A2, B2, C2 |
| Region 3 | A3, B3, C3, E, M1, N1 |
| ... | ... |

ROAD SEGMENT-BASED ROUTING GUIDANCE SYSTEM FOR AUTONOMOUS DRIVING VEHICLES

TECHNICAL FIELD

Embodiments of the present disclosure relate generally to operating autonomous vehicles. More particularly, embodiments of the disclosure relate to a routing guidance system for autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Routing, which is similar to the global positioning system, provides a general level of guidance that indicates general directions for autonomous driving vehicles. Conventional routings lack of efficient and flexibility in searching for an optimal route.

BRIEF DESCRIPTION OF THE DRAWINGS

Embodiments of the disclosure are illustrated by way of example and not limitation in the figures of the accompanying drawings in which like references indicate similar elements.

FIGS. 5A-5D are block diagram illustrating examples of data structures for maintaining road and lane configuration information according to certain embodiments.

FIG. 6 is a block diagram illustrating an example of lane regions according to one embodiment.

DETAILED DESCRIPTION

Figure 1:
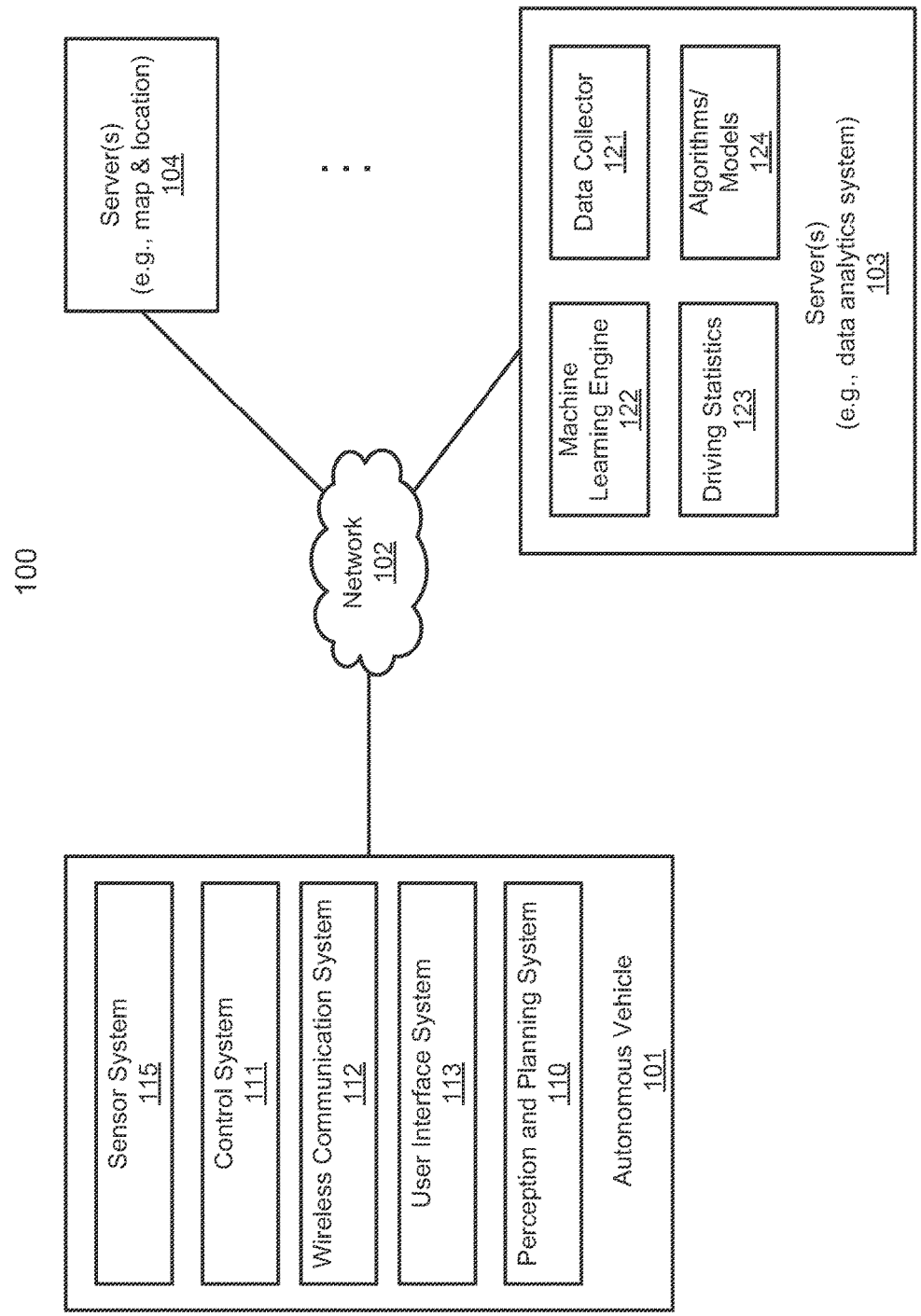
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In view of the foregoing shortfalls, according to some embodiments, a lane region-based or lane segment-based routing system is utilized that is flexible in terms of lane changing and robust in terms of covering all possible paths. According to some embodiments, lanes within a road form a road level topographic map in order to mark upstream, downstream, and neighboring lanes for the corresponding road to form a lane region. The lane region that can be used to change lane is also marked or labeled. Between roads, for each road, its entry lane and exit lane are marked. The connections between different lane regions are also calculated and marked at a lane level. The output of the routings will include a list of one or more lane regions. A lane region includes one or more lanes connected in sequence without lane changing laterally. A lane region can include lanes in sequences across multiple roads as long as without having to change lane laterally. At least some of the lane regions include road and/or lane connections to allow a route decision and planning process to search and identify all of the possible routes from a particular starting point (e.g., a starting lane of a starting road) to a particular destination (e.g., a destination lane of a destination road). The route decision and planning process can then select one of the routes as the most optimal routes in a combination of roads and lanes to drive the vehicle from the starting point to the destination point.

In one embodiment, a routing request is received for routing an autonomous driving vehicle (ADV) from a source lane associated with a source road (e.g., starting point) to a target lane associated with a target road (e.g., destination). Each of the source road and target road includes one or more lanes. In response to the routing request, one or more road paths are determined from the source road to the target road. Each of the road paths includes zero or more intermediate roads between the source road and target road (e.g., road connections at a road level), where each intermediate road includes one or more intermediate lanes. For each of the road paths, one or more lane paths are determined. Each lane path includes a number of lanes in combination to connect the source lane of the source road to the target lane of the target road via zero or more of the intermediate lanes of the intermediate roads. A trajectory is planned from the source plane of the source road to the target lane of the target road using the lane paths to drive the ADV according to the trajectory. In one embodiment, a set of lane regions are generated based on the lane paths. Each lane region includes one or more lanes of the lane paths connected in sequence without changing lane laterally. A lane changing may only occur between two lane regions, for example, with lanes adjacent to each other laterally. The lane regions are used to search and identify a route representing the trajectory, including identifying a lane changing point between at least two lanes of the lane regions.

According to one embodiment, in response to the routing request, a search is performed in a road-to-lane (road/lane) mapping table to identify the source road and the target road based on the source lane and the target lane, respectively. The road/lane mapping table includes a number of entries. Each entry maps a particular lane to a particular road, or vice versa. The road/lane table is used to specify which road contains which lane or lanes. Note that when a routing request is received, the routing request may only contain the source lane and the target lane without specifying the source road and the target road. In determining the road paths from the source road to the target road, according to one embodiment, for each of the road paths, a road connection table is searched to identify zero or more intermediate roads between the source road and the target road.

The road connection table includes a number of entries. Each entry maps a first road to a second road representing a road connection to allow a vehicle to change road from the first road to the second road. The intermediate roads are then added to the road path between the source road and the target road. In determining the lane paths, according to one embodiment, a lane connection table is searched to identify one or more intermediate lanes of the intermediate roads, if there is any, between the source road and the target road. The lane connection table includes a number of entries. Each entry maps a first lane to a second lane representing a lane connection to allow a vehicle to reach the second lane from the first lane. A lane connection can include lane changing between two lanes or straight following from one lane to another lane. The identified intermediate lanes are then added to the lane paths.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
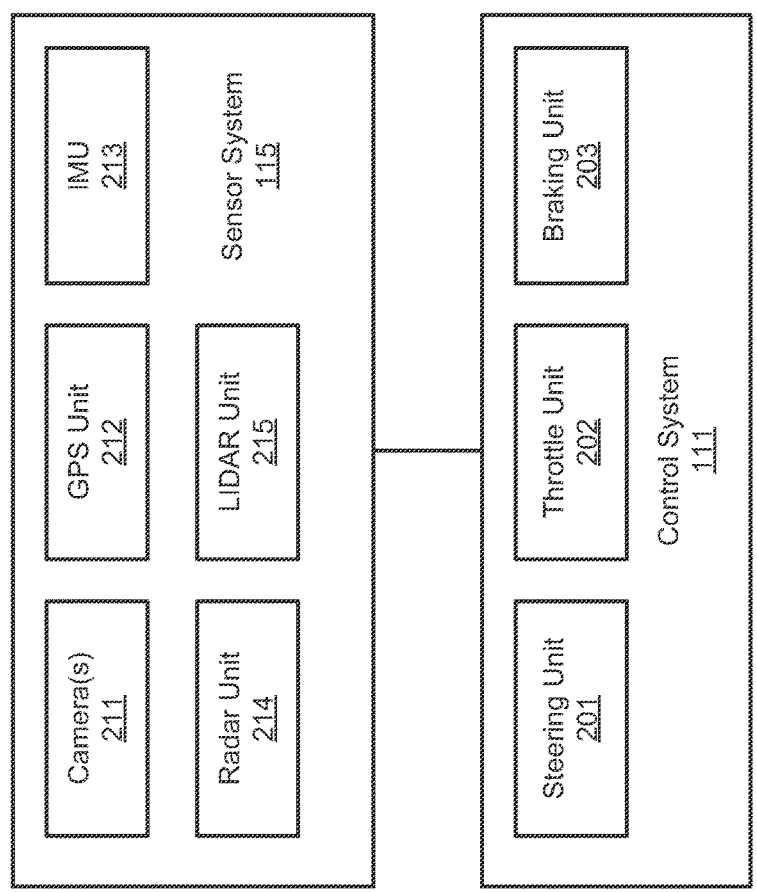
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Such captured commands and vehicle responses can be utilized to interpret or determine driver intentions at different points in time, such as intention to drive straight, turn left or right, change lane, etc. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, machine learning engine 122 generates a set of road-level tables and lane-level tables for routing purposes, collectively referred to as routing tables as a part of rules/models/tables 124. The routing tables may be generated based on route and map information obtained from route and map service providers. In addition, the routing tables may also include roads and/or lanes that have been used by many vehicles, but they are not included in the route and map information (e.g., new roads and lanes configuration).

In one embodiment, the routing tables may include a road connection table connecting one road to another road at a road level. The routing tables may include a road/lane mapping table that maps a particular road to a particular lane, or vice versa. The road/lane mapping table is utilized to identify which lane belongs to which road, or which road includes which lane, etc. The routing tables may further include a lane connection table. The lane connection table includes a number of entries. Each entry representing a lane connection from a first lane to a second lane, which may represent a lane changing point or location (e.g., lane existing and entry points) between the first lane and the second lane. The routing tables may further include a lane table contain information describing each lane, including the length, width, and location or position of the lane. The routing tables can then be uploaded to the autonomous driving vehicles to be utilized for routing at real-time.

Figure 3A:
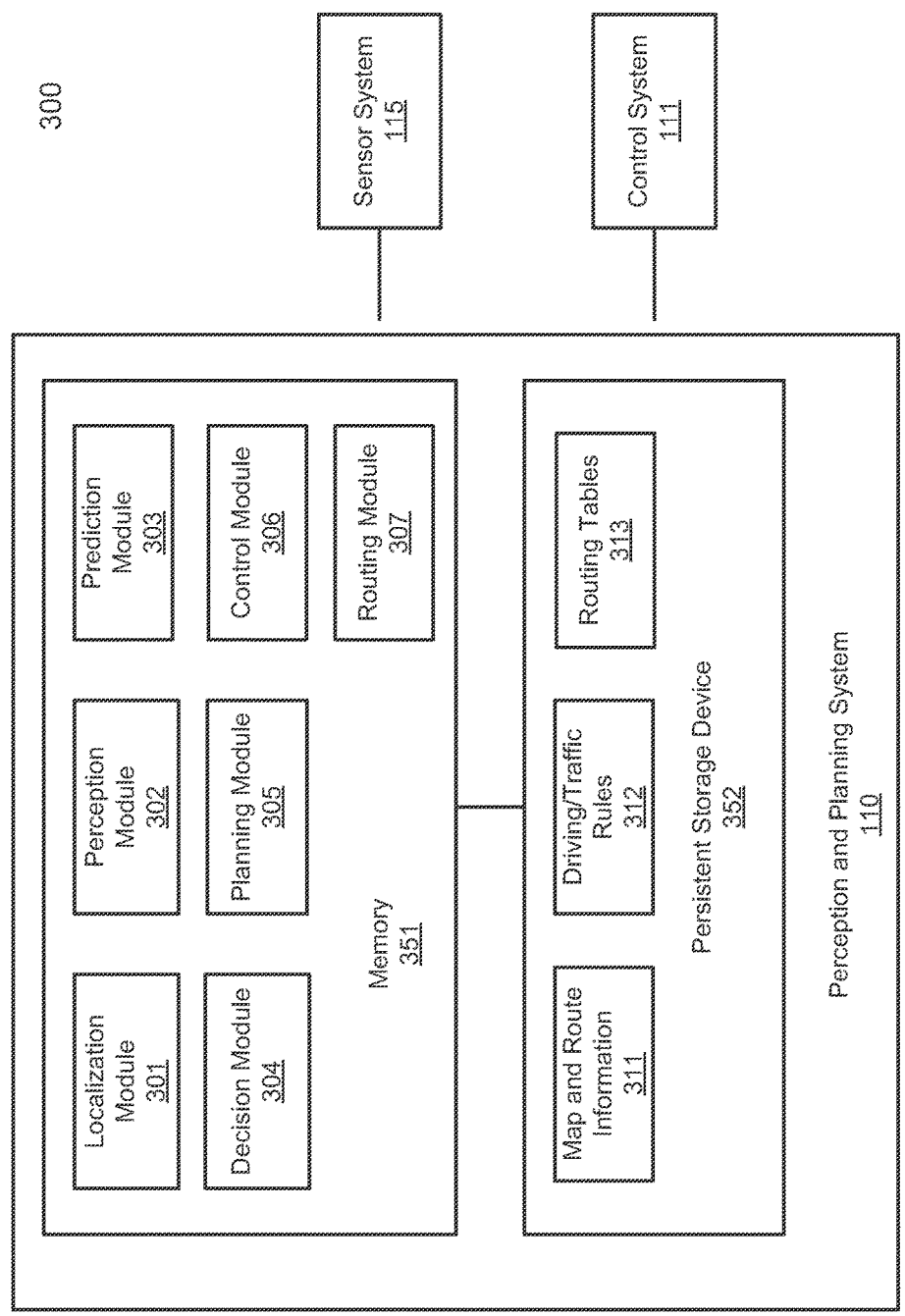
FIGS. 3A-3B are block diagrams illustrating an example of a perception and planning system used with an autonomous vehicle according to one embodiment.
Figure 3B:
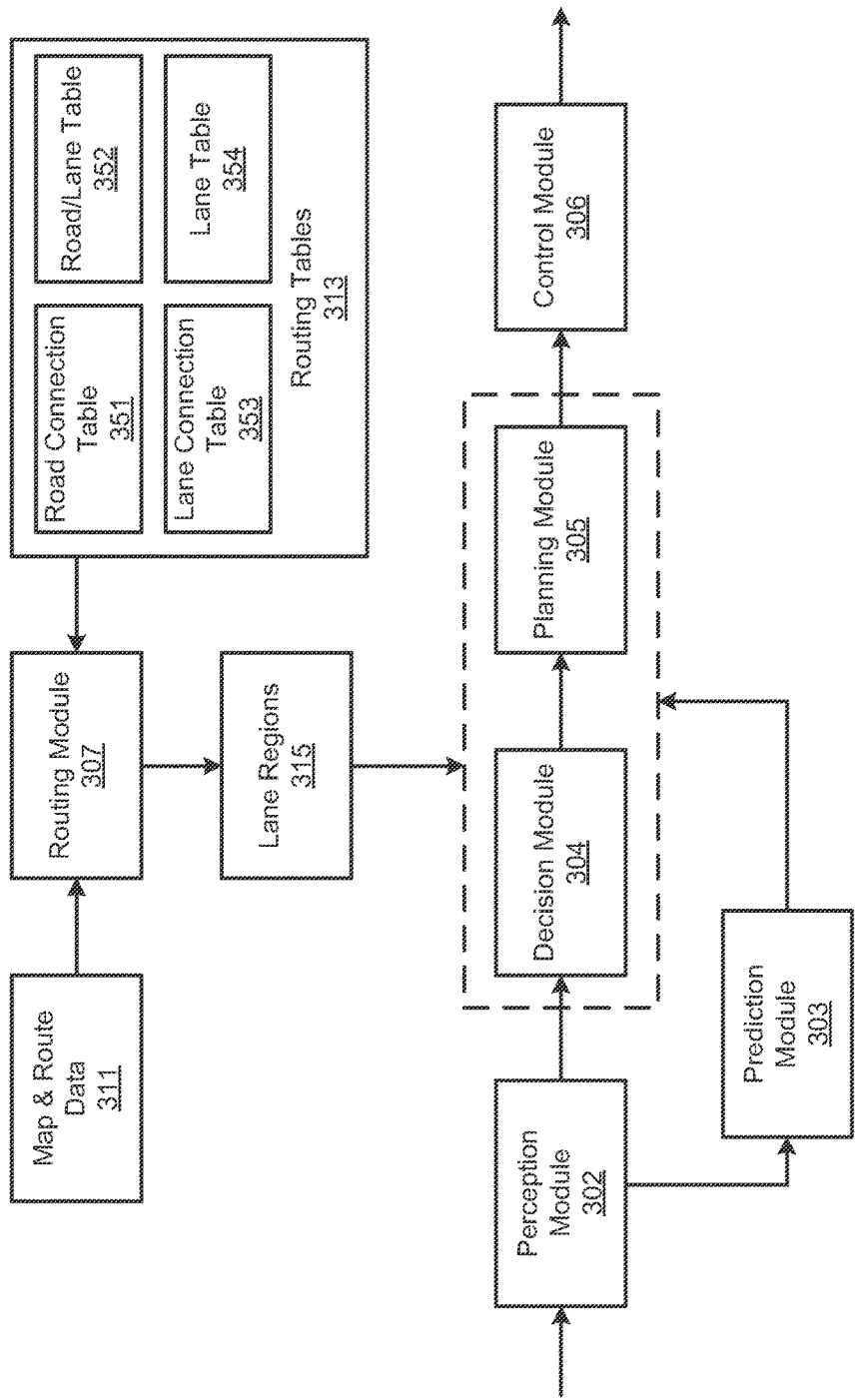

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point, which may represent an entire trip from beginning to the end or a segment of a trip. For a given trip from a start location to a destination location, for example, received from a user, routing module 307 obtains route and map information 311 and determines all possible routes or paths from the starting location to reach the destination location. Routing module 307 may generate a topographic map for each of the routes it determines from the starting location to reach the destination location. The topographic maps are then provided to decision module 304 and/or planning module 305. Decision module 304 and/or planning module 305 examines all of the possible routes to select one of the most optimal routes in view of other data provided by other modules such as traffic conditions from localization module 301, a driving environment perceived by perception module 302, and movements of other objects predicted by prediction module 303 (e.g., vehicles, pedestrians, obstacles).

Based on a decision for each of the objects by decision module 304 and routing information provided by routing module 307, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, routing module 307 is configured to generate a set of lane regions 315 using routing tables 313. Lane regions 315 can be used to select a route from a starting point to a destination by decision module 304 and/or planning module 305. Routing tables may be compiled offline based on route and map information by server 103. Alternatively, the routing tables 313 may be generated dynamically or online based on route and map information 311 of a section of map in which the ADV is driving. In one embodiment, routing tables 313 include a road connection table 351, a road/lane mapping table 352, lane connection table 353, and lane table 354, for example, as shown in FIGS. 5A-5D.

In one embodiment, referring to FIG. 5A, road connection table 351 includes a number of road connection entries, where each road connection entry maps or connects a particular road 501 to another road 502. Such a road connection entry indicates that a vehicle can move from a particular road to another particular road, including a starting lane 503 and an ending lane 504 that can reach from a starting road to an ending road. In one embodiment, referring to FIG. 5B, road/lane mapping table 352 includes a number of road/lane mapping entries, where each road/lane mapping entry maps or associates a particular road 511 with one or more lanes 512 of the road, or vice versa. Such a road/lane mapping entry specifies which lane is associated with or belongs to which road.

In one embodiment, referring to FIG. 5C, lane connection table 353 includes a number of lane connection entries, where each lane connection entry maps or connects a particular lane 521 to another particular lane 522, as well as a type of lane connection 523 (e.g., turn left, turn right, go straight). In this example, a lane connection of each entry indicates that a vehicle can reach lane 522 from lane 521 via a driving transaction 523. In one embodiment, referring to FIG. 5D, lane table 354 includes a number of lane entries, each lane entry corresponding to a particular lane 531. Each lane entry stores information describing the corresponding lane including, but is not limited to, a length of the lane 532, a width of the lane 533, and a location of the lane 534 (e.g., geographic location or coordinates (x, y) of the center point of the lane. In one embodiment, by matching the lane IDs and their locations, one can determine whether it is feasible to change lane from one lane to another, either keep following the current or exiting lane vertically or change lane laterally.

According to one embodiment, in response to a routing request from a source lane as a starting point to a target lane as a destination, routing module 307 searches in road/lane mapping table 352 based on the source lane and the target lane to identify a source road containing the source lane and a target road containing the target lane. Based on the source road and the target road, routing module 307 searches in road connection table 351 to identify zero or more intermediate roads that lead from the source road to reach the target road. Each of the intermediate roads, if there is any, includes one or more intermediate lanes. One or more road paths are generated from the source road to the target road at a road level. For each of the road paths, based on the source lane, zero or more intermediate lanes, and the target lane associated with the road path, routing module 307 searches in lane connection able 353 to generate one or more lane paths, each lane path having a sequence of lanes that connects the source lane with the target lane via zero or more intermediate lanes. Based on the lane paths, routing module 307 generates one or more lane regions, each lane region including one or more lanes of the lane paths in sequence without lane changing laterally. An example of lane regions is shown in FIG. 6. The lane regions can be utilized by decision module 304 and/or planning module 305 to plan a route from the source lane of the source road to the target lane of the target road. These road and lane configurations may have been configured or defined via a standard route and map service provided by a route and map service provider obtained via a standard application programming interface (API) or communication protocol.

Figure 4:
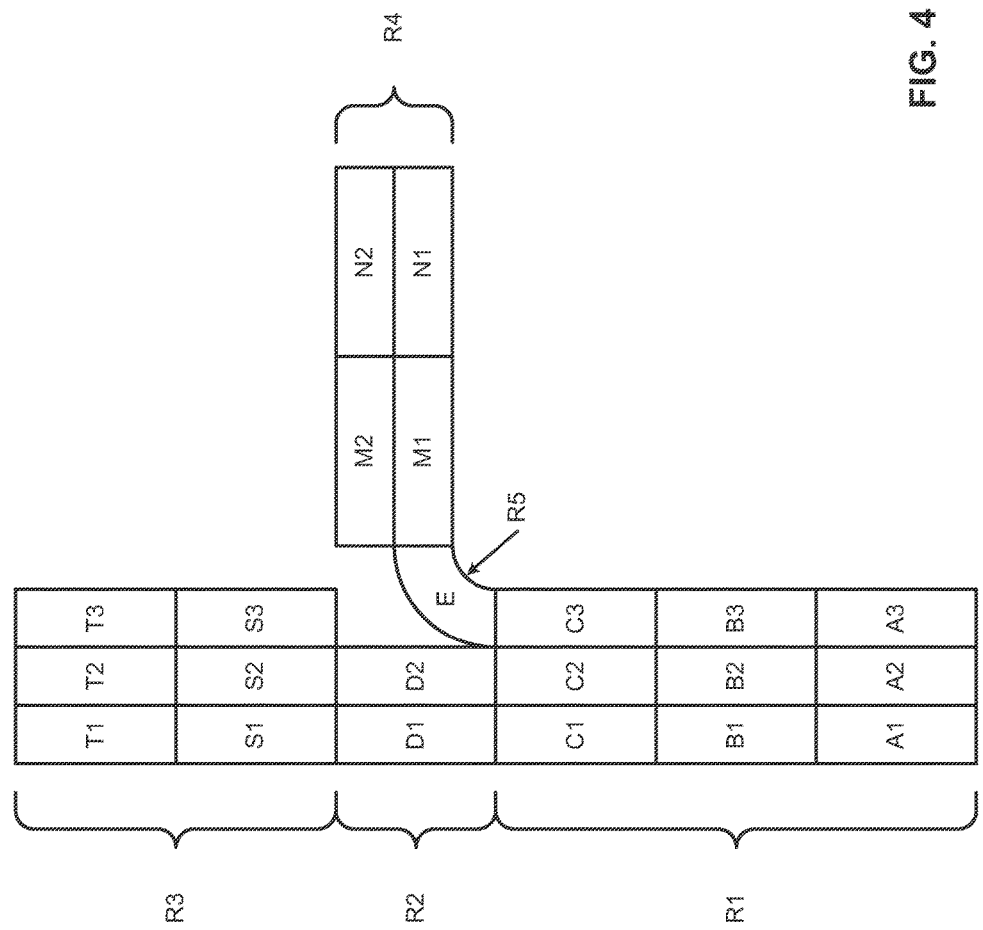
FIG. 4 is a block diagram illustrating an example of road and lane configuration which may be utilized with an embodiment.

For example, referring to FIG. 4 as an example of a road and lane configuration, this configuration includes roads R1, R2, R3, and R4. Each road includes one or more lanes. In this example, road R1 includes lanes A1-A3, B1-B3, and C1-C3. Road R2 includes lanes D1 and D2. Road R3 includes lanes S1-S3 and T1-T3. Road R4 includes lanes M1-M2 and N1-N2. Road R5 includes lane E.

In response to a routing request from source lane A1 to target lane N1, routing module 307 searches in road/lane mapping table 352 as shown in FIG. 5B to identify source road R1 associated with lane A1 and target road R4 associated with N1. Based on the source road R1 and target road R4, routing module 307 searches in road connection table 351 to identify the intermediate road(s) and lane(s) that connects source road R1 to target road R4. In this example, from entry 551, road R1 connects to R5 via lane C3. Road R5 connects to road R4 via lane M1 as indicated by entry 552. Thus, in order to reach target road R4 from source road R1, a vehicle has to go through intermediate road R5. The road connection or road path in this example is R1-R5-R4, which is a road level connection. For each of the roads R1, R4, and R5, routing module 307 searches lane connection table 353 to identify a lane connection between lanes of roads R1 and R5, and between lanes of roads R5 and R4. In this example, the lane connections can be identified as C3-E at entry 553 and E-M1 at entry 554. That means in order to reach road R5 from road R1, the vehicle has to exit road R1 via lane C3 and enter road R5 via lane E. Similarly, the vehicle has to exit road R5 via lane E and enter road R4 via lane M1.

Within road R1, routing module 307 identifies all the possible lane paths from source lane A1 to exiting lane C3: (1) A1-B1-C1-C2-C3, (2) A1-B1-B2-C2-C3, (3) A1-B1-B3-C3, (4) A1-A2-B2-C2-C3, and (5) A1-A2-A3-B3-C3. For road R5, in this example, there is only one lane, i.e., lane E. For road R4, from lane M1 to N1, there is only one lane path: M1-N1. Based on the above lane paths, routing module 307 generates one or more lane regions: 1) {A1, B1, C1}, 2) {A2, B2, C2}, and 3) {A3, B3, E, M1, N1}, as shown in FIG. 6. Reach lane region includes one or more lanes in sequence without lane changing laterally. The lane regions are then provided as an output to decision module 304 and/or planning module 305. Decision module 304 and/or planning module 305 can select one of the lane path to reach lane N1 from lane A1 based on the lane regions as shown in FIG. 6.

Based on the position and configuration of each lane obtained from lane table 354, it is easy to identify all the possible lane changing locations: A1-A2, A2-A3, B1-B2, B2-B3, C1-C2, and C2-C3. Decision module 304 and/or planning module 305 can select one of the paths based on the lane regions in view of the perception information (e.g., obstacles, traffic condition) as follows: (1) A1-B1-C1-C2-C3-E-M1-N1, (2) A1-B1-B2-C2-C3-E-M-N1, (3) A1-B1-B3-C3-E-M1-N1, (4) A1-A2-B2-C2-C3-E-M1-N1, and (5) A1-A2-A3-B3-C3-E-M1-N1. The lane region-based routing is more efficient and flexible compared to conventional routing methods. Once the lane regions have been identified, other lanes or roads on the map can be ignored for the purpose of routing or searching, which consume much more resources (e.g., processing power and memory). The searching can be performed more efficiently as it groups lanes in road first then lanes of the roads. The topographic map associated with the lane configuration can be much smaller (e.g., with a smaller memory footprint). It is more flexible because the decision and planning modules can easily identify the lane changing points between the lane regions, because there is no lane changing within a lane region. That will make the lane changing searching much quicker.

Figure 7:
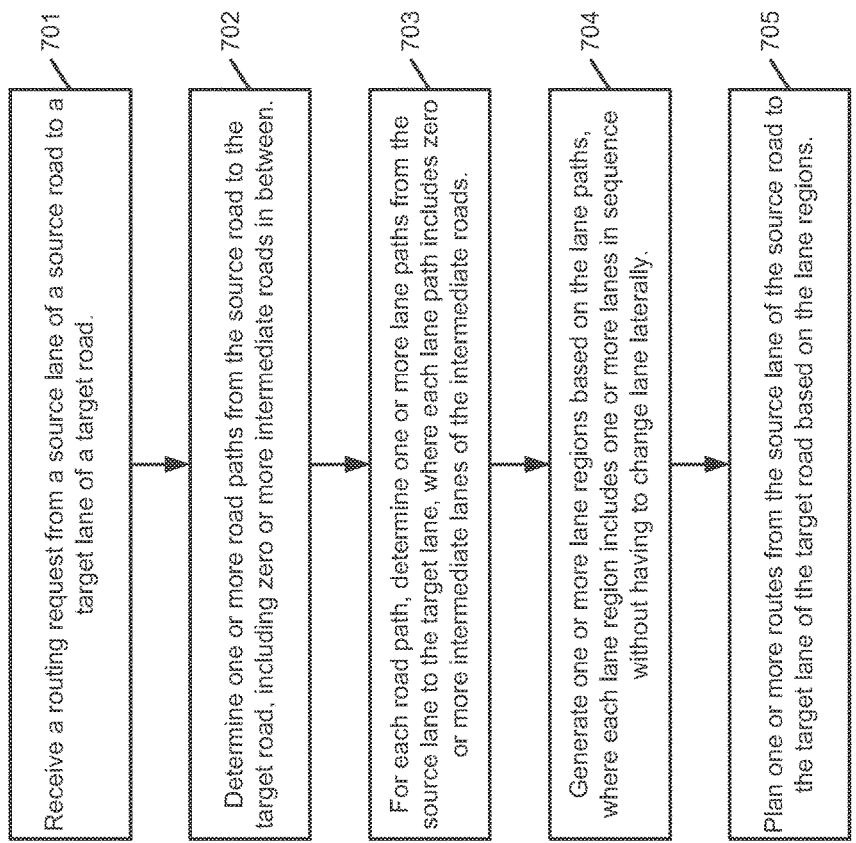
FIG. 7 is a flow diagram illustrating a routing process for operating an autonomous driving vehicle according to one embodiment.

FIG. 7 is a flow diagram illustrating a process of routing a path for driving an autonomous driving vehicle according to one embodiment. Process 700 may be performed by processing logic which may include software, hardware, or a combination thereof. For example, process 700 may be performed by routing module 307, decision module 304, and/or planning module 305. Referring to FIG. 7, in operation 701, processing logic receives a routing request for an ADV from a source lane of a source road to a target lane of a target road. In response to the routing request, in operation 702, processing logic determines one or more road paths from the source road to the target road. Each road path includes zero or more intermediate roads between the source road and the target road. In one embodiment, processing logic searches in a road connection table to identify road connections between the source road, zero or more intermediate roads, and the target road.

For each of the road path, in operation 703, processing logic determines one or more lane paths from the source lane of the source road to the target lane of the target road. Each lane path includes zero or more intermediate lanes. An intermediate lane can be a lane within the source road, an intermediate road, or the target road. In one embodiment, processing logic searches in a lane connection table to identify the lane paths connecting the source lane to the target lane via zero or more intermediate lanes. In operation 704, processing logic generates one or more lane regions based on the lane paths. Each lane region includes one or more lanes in sequence without having to change lane laterally. In operation 705, the lane regions are utilized to plan one or more routes from the source lane of the source road to the target lane of the target road based on the lane regions.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
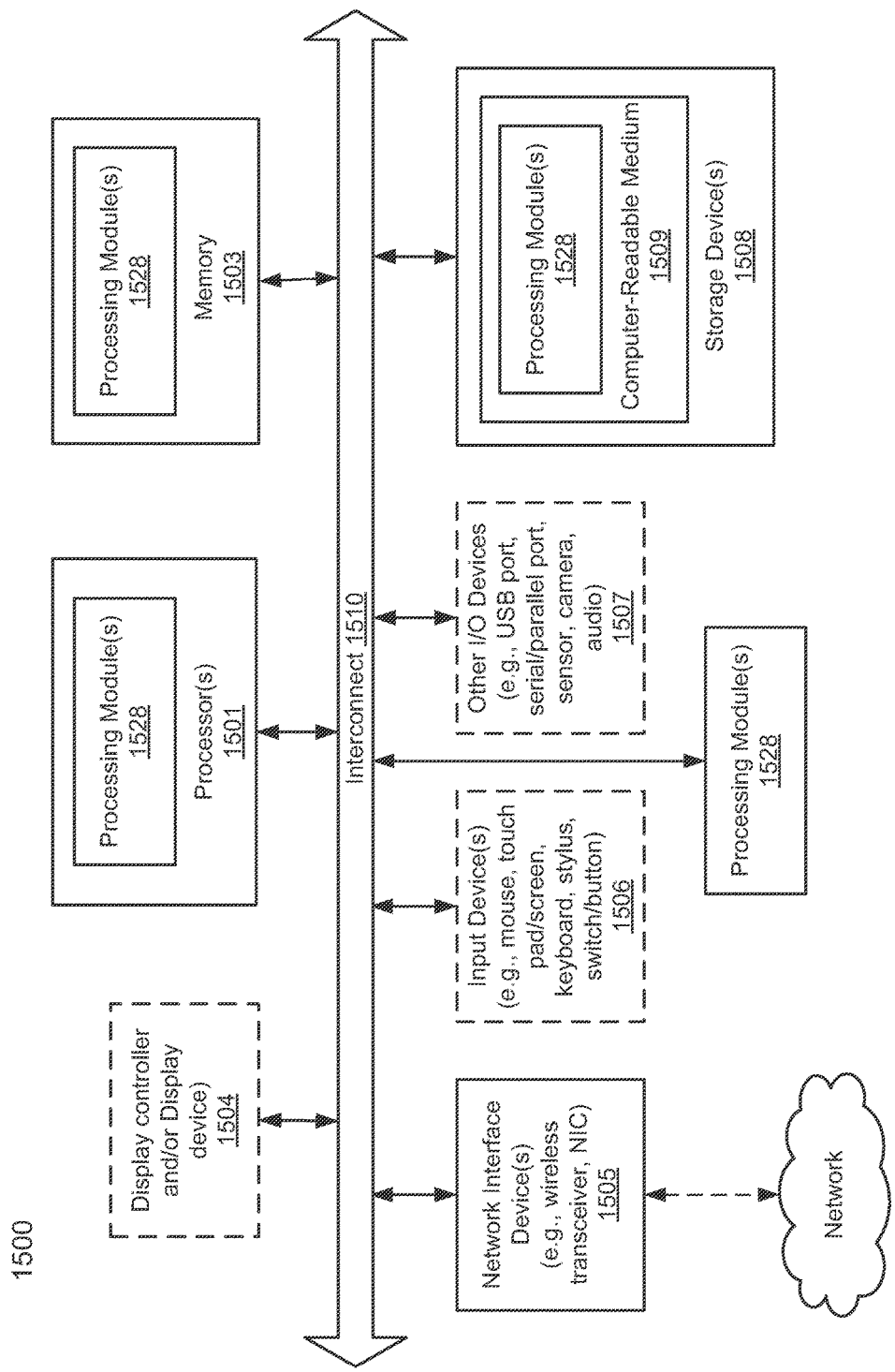
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, decision module 304, planning module 305, control module 306, and/or routing module 307. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   receiving a routing request for routing an autonomous driving vehicle (ADV) from a source lane to a target lane, the source lane being associated with a source road and the target lane being associated with the target road;
   in response to the routing request, determining one or more road paths from the source road to the target road, the road paths including zero or more intermediate roads between the source road and the target road, wherein each of the intermediate roads includes one or more intermediate lanes;
   for each of the road paths, determining one or more lane paths, each lane path having a plurality of lanes combined to connect the source lane of the source road to the target lane of the target road via zero or more of the intermediate lanes of the intermediate roads;
   generating a plurality of lane regions based on the lane paths, each lane region having one or more lanes of the lane paths connected in sequence without having to change lane laterally, at least one lane region including lanes connected in sequence across a plurality of roads without having to change lane laterally;
   planning a trajectory from the source lane of the source road to the target lane of the target road using the lane paths and the lane regions, comprising searching through the plurality of lane regions to identify a route representing the trajectory, including identifying a lane changing point between at least two of the lane regions; and
   generating control signals to drive the ADV according to the trajectory.

2. The method of claim 1, further comprising generating a topographic map for each of the lane paths, wherein the trajectory is determined based on the topographic maps of the lane paths.

3. The method of claim 1, wherein determining one or more road paths from the source road to the target road comprises:
   for each of the road paths, searching in a road connection table to identify zero or more intermediate roads between the source road and the target road; and
   adding the identified intermediate roads to the road path between the source road and the target road.

4. The method of claim 3, wherein the road connection table comprises a plurality of road mapping entries, and wherein each road mapping entry maps a first road to a second road representing a road connection to allow the first road to reach the second road.

5. The method of claim 1, wherein determining one or more lane paths comprises:
   for each of the lane paths, searching in a lane connection table to identify one or more intermediate lanes of the intermediate roads between the source road and the target road; and
   adding the identified intermediate lanes to the lane path between the source lane of the source road and the target lane of the target road.

6. The method of claim 5, wherein the lane connection table comprises a plurality of lane mapping entries, and wherein each lane mapping entry maps a first lane to a second lane representing a lane connection to allow the first lane to reach the second lane.

7. The method of claim 1, further comprising:
   in response to the request, searching in a road-to-lane (road/lane) mapping table based on the source lane to identify the source road; and searching in the road/lane mapping table based on the target lane to identify the target road, wherein the road/lane mapping table includes a plurality of road/lane mapping entries, each road/lane mapping entry mapping a particular road to one or more lanes within that particular road.

8. A non-transitory machine-readable medium having instructions stored therein, which when executed by a processor, cause the processor to perform operations, the operations comprising:

receiving a routing request for routing an autonomous driving vehicle (ADV) from a source lane to a target lane, the source lane being associated with a source road and the target lane being associated with the target road;

in response to the routing request, determining one or more road paths from the source road to the target road, the road paths including zero or more intermediate roads between the source road and the target road, wherein each of the intermediate roads includes one or more intermediate lanes;

for each of the road paths, determining one or more lane paths, each lane path having a plurality of lanes combined to connect the source lane of the source road to the target lane of the target road via zero or more of the intermediate lanes of the intermediate roads;

generating a plurality of lane regions based on the lane paths, each lane region having one or more lanes of the lane paths connected in sequence without having to change lane laterally, at least one lane region including lanes connected in sequence across a plurality of roads without having to change lane laterally;

planning a trajectory from the source lane of the source road to the target lane of the target road using the lane paths and the lane regions, comprising searching through the plurality of lane regions to identify a route representing the trajectory, including identifying a lane changing point between at least two of the lane regions; and generating control signals to drive the ADV according to the trajectory.

9. The machine-readable medium of claim 8, wherein the operations further comprise generating a topographic map for each of the lane paths, wherein the trajectory is determined based on the topographic maps of the lane paths.

10. The machine-readable medium of claim 8, wherein determining one or more road paths from the source road to the target road comprises:

for each of the road paths, searching in a road connection table to identify zero or more intermediate roads between the source road and the target road; and adding the identified intermediate roads to the road path between the source road and the target road.

11. The machine-readable medium of claim 10, wherein the road connection table comprises a plurality of road mapping entries, and wherein each road mapping entry maps a first road to a second road representing a road connection to allow the first road to reach the second road.

12. The machine-readable medium of claim 8, wherein determining one or more lane paths comprises:

for each of the lane paths, searching in a lane connection table to identify one or more intermediate lanes of the intermediate roads between the source road and the target road; and adding the identified intermediate lanes to the lane path between the source lane of the source road and the target lane of the target road.

13. The machine-readable medium of claim 12, wherein the lane connection table comprises a plurality of lane mapping entries, and wherein each lane mapping entry maps a first lane to a second lane representing a lane connection to allow the first lane to reach the second lane.

14. The machine-readable medium of claim 8, wherein the operations further comprise:

in response to the request, searching in a road-to-lane (road/lane) mapping table based on the source lane to identify the source road; and searching in the road/lane mapping table based on the target lane to identify the target road, wherein the road/lane mapping table includes a plurality of road/lane mapping entries, each road/lane mapping entry mapping a particular road to one or more lanes within that particular road.

15. A data processing system, comprising:

a processor; and a memory coupled to the processor to store instructions, which when executed by the processor, cause the processor to perform operations, the operations including receiving a routing request for routing an autonomous driving vehicle (ADV) from a source lane to a target lane, the source lane being associated with a source road and the target lane being associated with the target road, in response to the routing request, determining one or more road paths from the source road to the target road, the road paths including zero or more intermediate roads between the source road and the target road, wherein each of the intermediate roads includes one or more intermediate lanes, for each of the road paths, determining one or more lane paths, each lane path having a plurality of lanes combined to connect the source lane of the source road to the target lane of the target road via zero or more of the intermediate lanes of the intermediate roads, generating a plurality of lane regions based on the lane paths, each lane region having one or more lanes of the lane paths connected in sequence without having to change lane laterally, at least one lane region including lanes connected in sequence across a plurality of roads without having to change lane laterally;

planning a trajectory from the source lane of the source road to the target lane of the target road using the lane paths and the lane regions, comprising searching through the plurality of lane regions to identify a route representing the trajectory, including identifying a lane changing point between at least two of the lane regions; and generating control signals to drive the ADV according to the trajectory.

16. The system of claim 15, wherein the operations further comprise generating a topographic map for each of the lane paths, wherein the trajectory is determined based on the topographic maps of the lane paths.

17. The system of claim 15, wherein determining one or more road paths from the source road to the target road comprises:

for each of the road paths, searching in a road connection table to identify zero or more intermediate roads between the source road and the target road; and adding the identified intermediate roads to the road path between the source road and the target road.

18. The system of claim 17, wherein the road connection table comprises a plurality of road mapping entries, and wherein each road mapping entry maps a first road to a second road representing a road connection to allow the first road to reach the second road.

19. The system of claim 15, wherein determining one or more lane paths comprises:
- for each of the lane paths, searching in a lane connection table to identify one or more intermediate lanes of the intermediate roads between the source road and the target road; and
- adding the identified intermediate lanes to the lane path between the source lane of the source road and the target lane of the target road.

20. The system of claim 19, wherein the lane connection table comprises a plurality of lane mapping entries, and wherein each lane mapping entry maps a first lane to a second lane representing a lane connection to allow the first lane to reach the second lane.

21. The system of claim 15, wherein the operations further comprise:
- in response to the request, searching in a road-to-lane (road/lane) mapping table based on the source lane to identify the source road; and
- searching in the road/lane mapping table based on the target lane to identify the target road, wherein the road/lane mapping table includes a plurality of road/lane mapping entries, each road/lane mapping entry mapping a particular road to one or more lanes within that particular road.

* * * * *